(12) United States Patent
Fischer

(10) Patent No.: US 7,013,797 B2
(45) Date of Patent: Mar. 21, 2006

(54) CAPSULE MAGAZINE UNIT WITH A CAPSULE RETAINING MEMBER

(75) Inventor: Daniel Fischer, Romanshorn (CH)

(73) Assignee: Nestec S.A., Vevey (CH)

( * ) Notice: Subject to any disclaimer, the term of this patent is extended or adjusted under 35 U.S.C. 154(b) by 16 days.

(21) Appl. No.: 10/777,042

(22) Filed: Feb. 13, 2004

(65) Prior Publication Data
US 2004/0168577 A1    Sep. 2, 2004

(30) Foreign Application Priority Data
Feb. 13, 2003    (DE) .............. 203 02 410 U

(51) Int. Cl.
*A47J 31/00* (2006.01)
*A47J 31/34* (2006.01)

(52) U.S. Cl. .............. 99/287; 99/289 R; 99/290; 99/295; 99/302 P

(58) Field of Classification Search .......... 99/485, 99/494, 280, 281, 287, 289 R, 290, 295, 99/287 D, 289 P, 387, 289 T, 302 P; 221/209, 221/277, 150 A, 87, 121, 199, 303, 309
See application file for complete search history.

(56) References Cited

U.S. PATENT DOCUMENTS

| | | | | |
|---|---|---|---|---|
| 1,576,010 A | * | 3/1926 | Swartz | 221/281 |
| 3,200,925 A | * | 8/1965 | Swaney | 194/299 |
| 3,295,998 A | * | 1/1967 | Goros | 99/282 |
| 3,440,951 A | * | 4/1969 | Barrera | 99/282 |
| 3,604,592 A | * | 9/1971 | Bacon et al. | 221/96 |
| 4,724,752 A | * | 2/1988 | Aliesch et al. | 99/289 R |
| 4,744,491 A | * | 5/1988 | Bani et al. | 221/172 |
| 4,784,050 A | * | 11/1988 | Cavalli et al. | 99/289 R |
| 5,134,924 A | * | 8/1992 | Vicker | 99/280 |
| 6,240,832 B1 | | 6/2001 | Schmed et al. | 99/289 R |
| 6,595,106 B1 | | 7/2003 | Eugster | 99/289 R |

FOREIGN PATENT DOCUMENTS

| | | |
|---|---|---|
| DE | 200 15 903 U1 | 1/2001 |
| DE | 201 05 672 U1 | 10/2001 |
| EP | 1 046 366 A1 | 10/2000 |
| EP | 1 247 481 A1 | 10/2002 |
| WO | WO 02/078499 A1 | 10/2002 |

* cited by examiner

*Primary Examiner*—Timothy F. Simone
(74) *Attorney, Agent, or Firm*—Bell, Boyd & Lloyd LLC

(57) ABSTRACT

A capsule magazine unit having a holding device for capsule magazine unit, into which the capsule magazine unit can be releasably inserted, such as of an espresso machine. The capsule magazine unit can comprise at least one essentially vertical capsule magazine tube that is suitable for holding capsules of coffee or other beverage or food forming components stacked one above another and can have a lateral capsule removal opening at the bottom. A locking ring, which is arranged around the capsule magazine unit, can be displaced essentially vertically with respect to the capsule magazine unit. At least one locking-ring lifting element on a holding device for holding the capsule magazine unit can be provided that is suitable for acting on the locking ring.

21 Claims, 4 Drawing Sheets

CAPSULE MAGAZINE UNIT WITH A CAPSULE RETAINING MEMBER

FIELD OF THE INVENTION

The invention relates to a capsule magazine unit having a holding device for capsules in the unit, and more particularly to a capsule magazine unit with a capsule holding device for use, such as by insertion, into an espresso machine.

BACKGROUND OF THE INVENTION

Capsule magazine units are known, for instance in U.S. Pat. No. 6,595,106, that keep capsules having the substance which is to be prepared, in particular different types of espresso coffee, ready for preparation in an organized and easily selectable manner. Accordingly, a plurality of capsule magazine tubes can be arranged in the shape of a circular ring or else in a linear row as the capsule magazine unit. The capsule magazine unit can be a releasable part of an espresso machine, but may also be formed separately from the latter. The capsule magazine unit can be removed from the holding device for the capsule magazine unit for convenient fitting with the different coffee capsules and can then be re-inserted into it. Each capsule magazine tube which is part of the capsule magazine unit has a lower capsule removal opening which is arranged laterally or radially outwards if the capsule magazine tubes are arranged in a circle. The lowermost capsule can be removed in each case manually from this capsule removal opening or—preferably if the holding device for the capsule magazine unit is integrated in an espresso machine—can be pushed out of the capsule removal opening by mechanical means in order to convey it into a brewing position to prepare the espresso.

Although the capsule magazine units have made great progress in the simple and reliable preparation of drinks, in particular the preparation of espresso, it can be perceived as being a drawback that, when the capsule magazine unit has been removed from the holding device for the capsule magazine unit, in particular of an espresso machine, the capsules may unintentionally slide out of the removal openings of the magazine tubes, in particular if the capsule magazine unit is tilted.

SUMMARY OF THE INVENTION

The present invention relates to a capsule magazine unit that is releasably associable with a magazine receiving portion of a device for preparing a food or beverage. The preferred embodiment has at least one capsule magazine configured for receiving a plurality of capsules that contain a substance for preparing the food or beverage. The magazine has a removal opening configured and dimensioned for removal of the capsules from the magazine. A capsule retainer is associated with the magazine and movable with respect thereto between a retaining position and a releasing position. In the retaining position, the retaining member blocks the removal opening sufficiently to keep the capsules from falling through the retaining opening. In the releasing position, the retaining member allows the capsules to be removed from the magazine through the opening for the preparation of the food. Additionally, a retainer positioner is associated with the retainer and configured for moving the retainer between the retaining and the releasing position upon an association of the positioner with a first portion of the device.

Preferably, the positioner extends from the retainer. Also, the positioner can be configured for contacting the first portion as the magazine unit is placed moved into association with the magazine receiving portion, such that the first portion displaces the positioner, which displaces the retainer. The first portion can be configured to block the positioner from movement past the first portion during insertion of the capsule magazine unit into the magazine receiving portion. The retainer can be slideably mounted with respect to the capsule magazine.

A base of the magazine unit may be configured for limiting movement of the retainer. An embodiment of the base defines a slot with a shape and position corresponding to the first portion of the device and configured for allowing the first portion to pass through the base to the association with the positioner. The slots can be configured for allowing the first portion to pass through the base substantially unimpeded by the base. In another embodiment, the retainer protrudes laterally with respect to the base with respect to a direction of movement between the retaining and releasing positions, such that the first portion is able to pass adjacent the base to the association with the positioner.

The positioner is preferably configured for moving the retainer from the retaining position to the releasing position. The retainer can also be configured for moving from the releasing position to the retaining position by gravity.

The capsule magazine may have a magazine axis along which the capsules are stacked, with the removal opening configured and oriented for removal of the capsule therethrough in a generally radial direction with respect to the magazine axis. Also, a preferred embodiment has a plurality of capsule magazines which can be disposed generally parallel to each other. A preferred arrangement of the magazines is in a substantially round shape for positioning the magazines selectively in unloading positions using a revolving member of the magazine receiving portion. In such an arrangement, the retainer can include a capsule retaining ring surrounding the capsule magazines.

Preferably, the magazine is configured for receiving capsules that are dimensioned to each contain a beverage component with in an amount to prepare a single serving of a beverage. The preferred contents of the capsules are beverage forming components such as coffees, although other foods or beverage components may be used.

A preferred food preparation device embodiment includes the capsule magazine unit described herein, along with a magazine receiving portion comprising the first portion, and a capsule handling mechanism operably associable with the capsules for removing the capsules from the removal opening. The device can have a member for emptying the contents from the capsules, and can include a mixing device configured for mixing contents of the capsules with a fluid to produce the food or beverage.

DETAILED DESCRIPTION OF THE PREFERRED EMBODIMENTS

Figure 1:
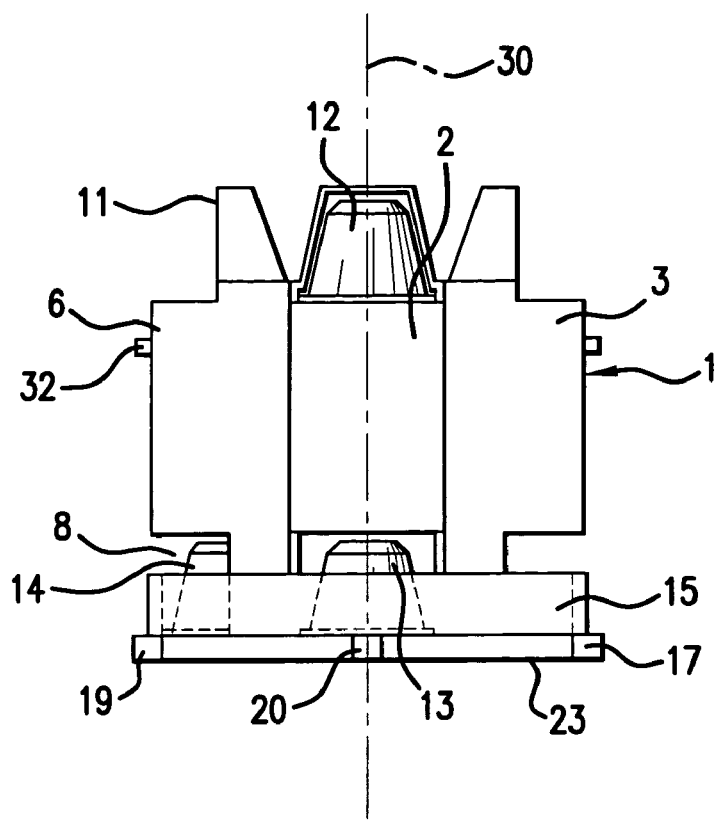
FIG. 1 shows a side view of a capsule magazine unit of a first embodiment constructed according to the invention, which is configured as a rotary magazine.

One preferred embodiment of the present invention relates to a capsule magazine unit wherein the capsules cannot slide out of the capsule magazine unit, e.g., on or more magazine tubes, when the capsule magazine has been removed from the holding device. This problem is avoided without complicating handling of the capsules.

A retaining member, such as a retaining or blocking ring, which can be referred to as a locking ring, is preferably provided to prevent the capsules from falling out of lateral capsule removal openings of the capsule magazine unit. For an embodiment in which the capsule magazine tubes are orientated substantially in parallel, such as vertically, the blocking member can be displaceable axially, for instance vertically, with respect to these tubes. In a lower blocking or retaining position, into which the blocking member preferably can automatically slide as a consequence of gravity when the capsule magazine unit has been removed from the holding device, the blocking ring preferably covers the capsule removal openings of the capsule magazine tubes to an extent sufficient to retain them in the magazine unit such and such that the capsules are not able to fall out of the capsule removal opening. At least one blocking-ring positioning member, such as a lifting element, is also preferably provided, and may be a simple lug.

The food or beverage preparing substances are generally powders that can be reconstituted with a fluid, such as water or milk, to form a beverage or food product. The most preferred substances are those in powder form for the preparation of soup or beverages such as coffee, tea, cocoa or hot chocolate. These powders are retained in the capsules.

When the capsule magazine unit—typically filled with coffee capsules—is inserted into the holding device, such as in an espresso or other beverage machine, the blocking-ring lifting element preferably blocks the blocking ring from further movement into the holding device, while the magazine unit continues to move into the holding device. In this manner, the blocking ring reaches an upper release position in relation to unblock the capsule removal opening so that a lower capsule for preparing a drink or drinks can be removed in each case from the capsule removal opening.

In the preferred embodiments, special handling of the blocking ring by a user is therefore not required. To the contrary, the blocking or retaining function of the blocking ring can be automatically activated when the capsule magazine unit is removed from the holding device, as well as the unblocking of the capsule removal openings when the capsule magazine unit is introduced into the holding device.

The shape of the blocking ring or other blocking member preferably corresponds to the collective shape of the arrangement of the magazine tubes in the magazine unit, This, the capsule removal openings can be at least partially covered with the blocking ring in the lower blocking position, and the blocking ring can be displaced along the capsule magazine tubes.

In the case of a particularly expedient, circular arrangement of the capsule magazine tubes, the blocking ring may be of a circular, ring shape. For guidance purposes during the vertical displacement with respect to the capsule magazine tubes, the blocking ring can be configured to simply to rest linearly on the said tubes. The friction during displacement is preferable small so the blocking ring can slide axially on the tubes.

The preferred device is also uncomplicated because the blocking-ring lifting element can be at least one simple, passive element, such as a lug protruding inwards on the capsule magazine unit opening of the holding device. In another embodiment, the blocking-ring lifting element is integrated in the blocking ring, for example as a lug that projects outwards from the blocking ring or as an outer collar, or by dimensioning the external diameter of the blocking ring sufficiently large to catch on a portion of the holding device.

One embodiment of the capsule magazine unit has a base on which the blocking ring rests when the capsule magazine unit has been removed from the holding device. The base has openings to receive at least one lug that protrudes generally inwards into a space in which the magazine unit is received. The lug functions as a blocking-ring lifting element on which the blocking ring rests when the capsule magazine unit has been inserted into the holding device for the capsule magazine unit. The opening in the base of the magazine unit can include at least one outwardly open slot through which the lug of the holding device can pass when the capsule magazine unit is moved in or out of the holding device. The base of the capsule magazine unit can set the lower blocking position of the blocking ring, towards which the blocking ring can be urged by gravity or other means. The release position of the blocking ring is reached when the capsule magazine unit is inserted into the holding device, with the blocking ring lowered onto the lug. In this case, the blocking ring is held above the capsule removal openings on the lug of the magazine holding device to unblock the capsule removal opening sufficiently to allow at least one capsule to be removed.

Although, one lug may be sufficient for controlling the position of and supporting the blocking ring, at least two, and more preferably more than two, lugs spaced from one another is advantageous. The lugs or other lifting elements are preferably configured and positioned so that the blocking ring rests on them substantially without tilting, or without tilting sufficiently that the sliding of the blocking is substantially inhibited. Coordinated with them, are preferably a plurality of slots offset at a distance around the circumference of the base from the base of the capsule magazine unit. The base can be round to give a circular arrangement of a plurality of capsule magazine tubes and preferably can be lowered past the lugs or other lifting elements. Preferably, the slots are arranged in the base in such a manner that in all possible operational positions of capsule magazine unit, such as in those positions in which the capsules may be removed therefrom and taken into the espresso machine, the magazine unit can be pulled out of the holding device substantially without or with minimal rotation of the magazine unit, such as by providing the slots vertically aligned with all of the lugs, or aligned therewith in the direction of removal of the magazine unit from the holding device.

In another embodiment, slots in the base are not used, and lugs on the blocking ring can be arranged freely along the outer circumference thereof without obstructing the removal of the capsule magazine unit from the holding device for the capsule magazine unit.

In addition, the capsule magazine unit can have, at a vertical distance above the capsule removal openings, an upper stop that upwardly keeps the blocking ring from sliding out of the capsule magazine unit. The stop can comprise a circular-ring-shaped collar of the capsule magazine unit at a sufficient distance above the capsule removal openings.

In the figures, corresponding features are provided with the same reference numbers, and the reference numbers that are used indicate the following features:

| | |
|---|---|
| 1, 1a | capsule magazine unit |
| 2–7 | capsule magazine tube |
| 8 | capsule removal opening |
| 9, 9a | holding device for the capsule magazine unit |
| 10 | espresso machine body |
| 11 | capsule-magazine insertion mechanism |
| 12–14 | coffee capsule |
| 15 | blocking ring (first embodiment) |
| 16, 16a | blocking-ring lifting element (lug, first embodiment) |
| 17 to 22 | slot |
| 23, 23a | base |
| 24 | base support |
| 25 | blocking ring (second embodiment) |
| 26 to 29 | blocking-ring lifting element (lug, second embodiment) |

Figure 3:
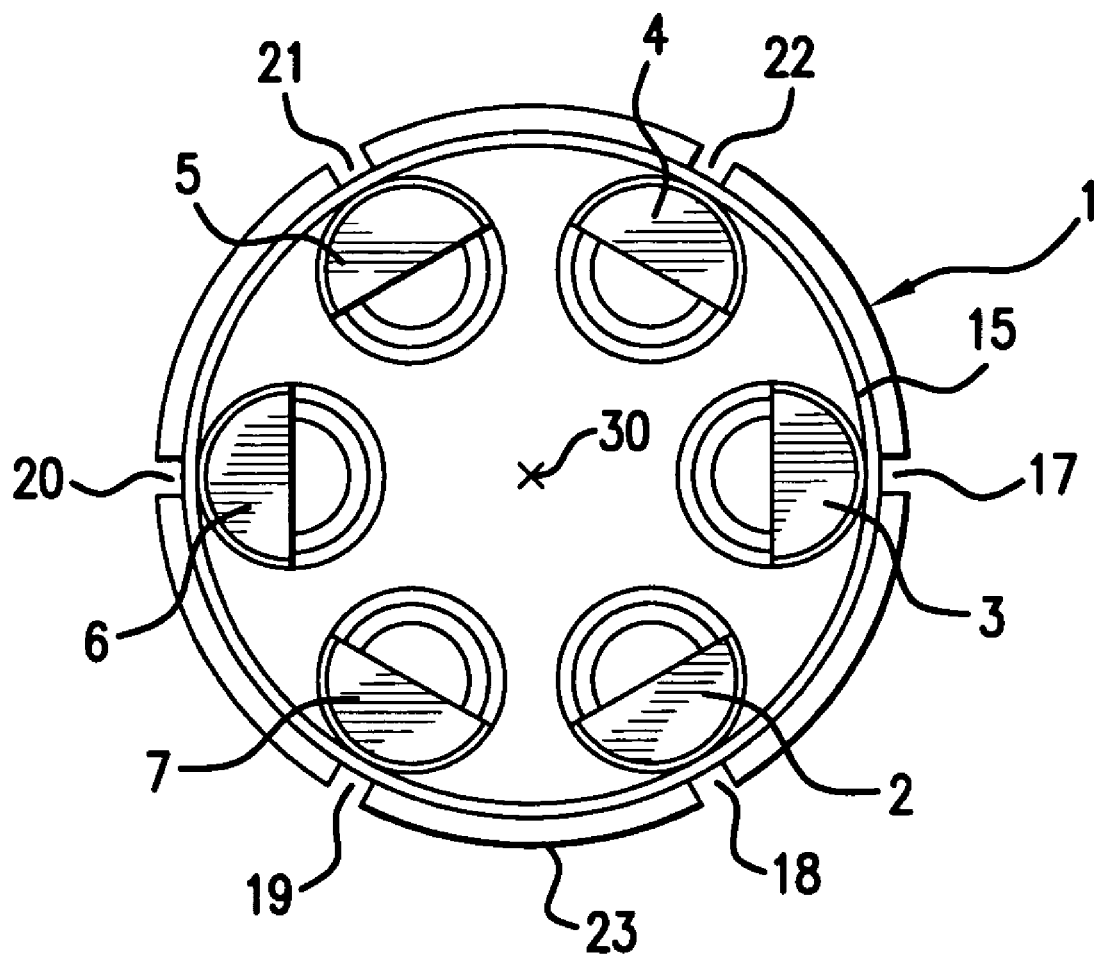
FIG. 3 shows a plan view of the capsule magazine unit when detached from the holding device for the capsule magazine unit according to FIG. 1.

The capsule magazine unit embodiment referred to in general by 1 in FIGS. 1 and 3 comprises six essentially cylindrical capsule magazine tubes which are vertical in the operational position and are fitted in a circular arrangement on a round base 23. Each capsule magazine tube, e.g. 6, has a capsule removal opening, e.g. 8, at the bottom above the base 23. The capsule removal opening 8 is preferably oriented radially outwards with respect to a main axis 30 of the capsule magazine unit, so that the lowermost of the coffee capsules stacked in the capsule magazine tube can be pushed out of the capsule magazine tube 6 through the capsule removal opening 8. For this purpose, in the present exemplary embodiment, since the capsule magazine unit 1 can be inserted in the operational position into a holding device 9 of an espresso machine body 10, use can be made of a mechanism in the espresso machine as known in the art to automatically remove the coffee capsule from a capsule magazine tube, which is rotated into a removal position, and convey this coffee capsule to a brewing position.

Figure 2:
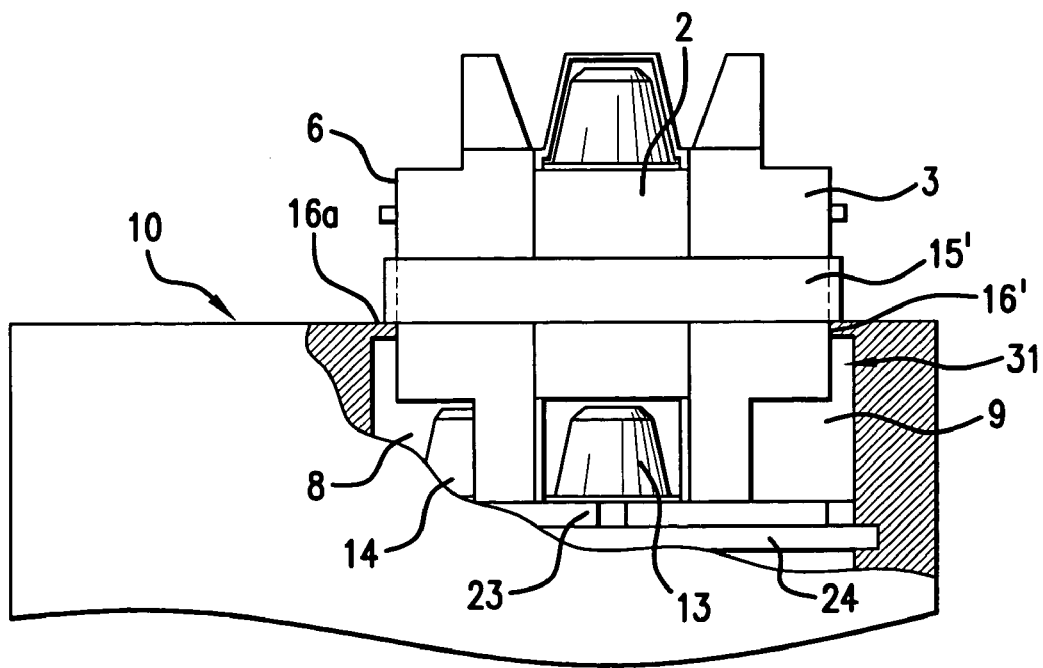
FIG. 2 shows the capsule magazine unit according to FIG. 1 inserted into a holding device for the capsule magazine unit, as part of an espresso machine body.

To fill the capsule magazine unit with coffee capsules of certain types of espresso coffee, which capsules can be sorted in the different capsule magazine tubes 2 to 7 according to the capsule contents, the capsule magazine unit is removed preferably from the holding device 9, or from the espresso machine body 10 to be filled remotely from the machine body if desired. For this purpose, the coffee capsules are introduced into insertion openings of insertion mechanisms, e.g. 11, formed at the top of the capsule magazine tubes, and are stacked in the capsule magazine tubes. The insertion mechanisms are matched for this purpose to the essentially truncated-cylinder shape of the coffee capsules, so that the coffee capsules can be stacked only in the desired orientation with the base downwards. The coffee capsules which can be seen in FIGS. 1 and 2 are referred to by 12 to 14. The capsule magazine unit 1 is preferably filled with coffee capsules only to an extent such that it is not possible for any coffee capsule, such as here the coffee capsule 12, to slide laterally counter to the insertion direction out of the insertion mechanism.

In order to avoid an undesirable sliding of the lower coffee capsules, e.g. 12, 13, out of the capsule removal openings, e.g. 8, such as when the detached capsule magazine unit 1 is inclined, a circular-ring-shaped, vertically displaceable blocking ring 15 is provided around the capsule magazine unit. The internal diameter of the blocking ring is of sufficient size that the blocking ring bears in a slideable manner against outer surface lines of the capsule magazine tubes 2 to 7. It is therefore guided by the capsule magazine tubes 2 to 7. In other embodiments, the blocking ring can be associated to move in a different manner with respect to the tubes and may be mounted differently to the rest of the magazine unit. Preferably, if the blocking ring has a smaller axial or vertical height than the height of the capsule removal openings 8, additional guides (which are not shown in the drawing) may be provided in the region of the capsule removal openings to guide the blocking ring in this region.

In the lower blocking position of the blocking ring 15, the position of which is illustrated in FIG. 1 and may also be referred to as the retaining position since the coffee capsules, e.g. 13, 14, are held back in it against sliding out of the magazine tubes, the blocking ring 15 rests on the base 23 of the capsule magazine unit. Without further actuating means, it is preferably able to slide downwards onto the base only by means of gravity.

Without special manual actuation, the blocking ring 15 passes from the lower blocking position into an upper release position with respect to the capsule removal openings 8 by the capsule magazine unit 1 simply being introduced correctly from above into the holding device 9 for the capsule magazine unit, as illustrated in FIG. 2, in which the blocking ring is in the release position. It is held in the release position by blocking-ring lifting elements 16,16a which are orientated inwards towards the vertical main axis of the holding device 9 for the capsule magazine unit or of the capsule magazine unit 1 inserted therein. In the embodiment shown, the blocking-ring lifting elements are arranged substantially equidistantly in the circumferential direction of an upper holding opening 31 of the holding device 9 and are therefore suitable for holding the blocking ring 15 preferably in a substantially level orientation.

The arrangement of slots 17 to 22 on the edge of the base 23 is matched, according to FIG. 3, to the configuration of the blocking-ring lifting elements. In detail, the slots in the base are shaped in such a manner that they permit the base to pass by the blocking-ring lifting elements, e.g. 15, 16, with the slots aligned with the lifting elements, when the capsule magazine unit 1 is inserted into the holding device 9 or is removed therefrom, by a preferably axial movement during removal from any possible operational capsule removal position or latching position of the capsule magazine unit.

The capsule magazine unit 1 may also be provided with an upper stop 32 that prevents the blocking ring 15 from unintentionally sliding out upwards off the capsule magazine tubes 2 to 7. This prevents accidental misplacement of the blocking ring.

In FIG. 2, the base 23 of the capsule magazine unit 1 rests on a base support 24 in the espresso machine body 10. The support can be configured as a revolving magazine drawer and as such is described, for example, in related application PCT/EP02/03281.

Figure 4:
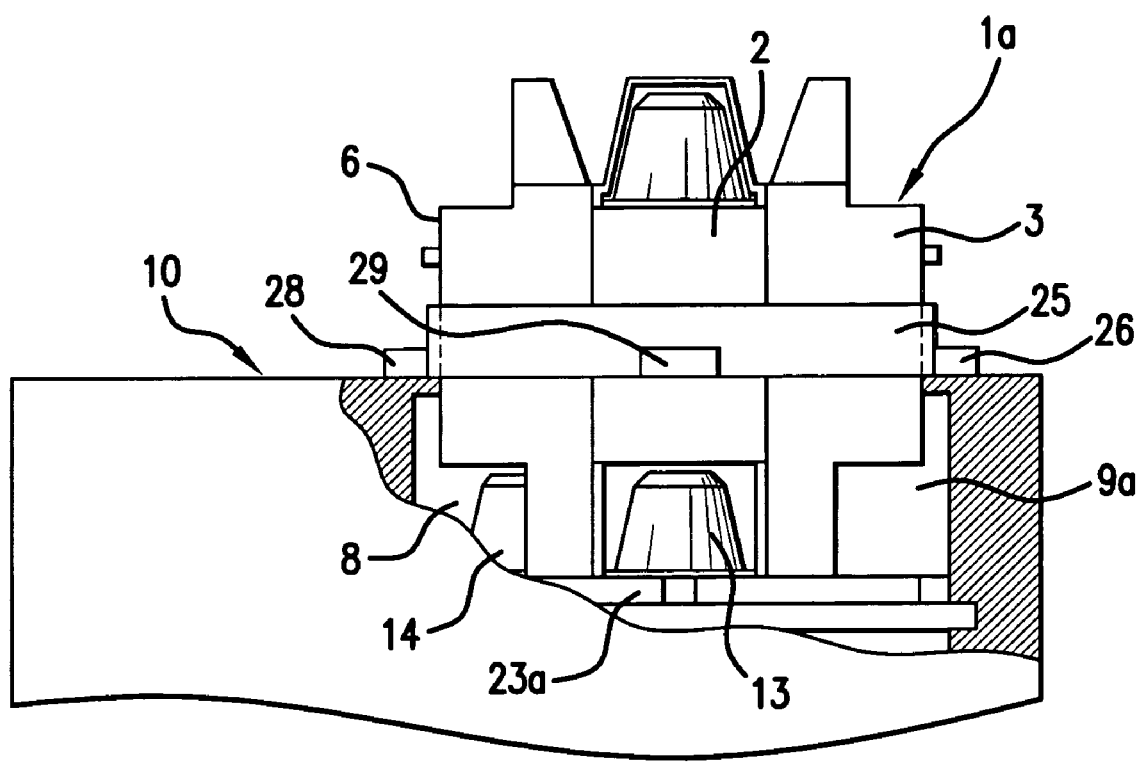
FIG. 4 shows a capsule magazine unit of a second embodiment inserted into the holding device for the capsule magazine unit.
Figure 5:
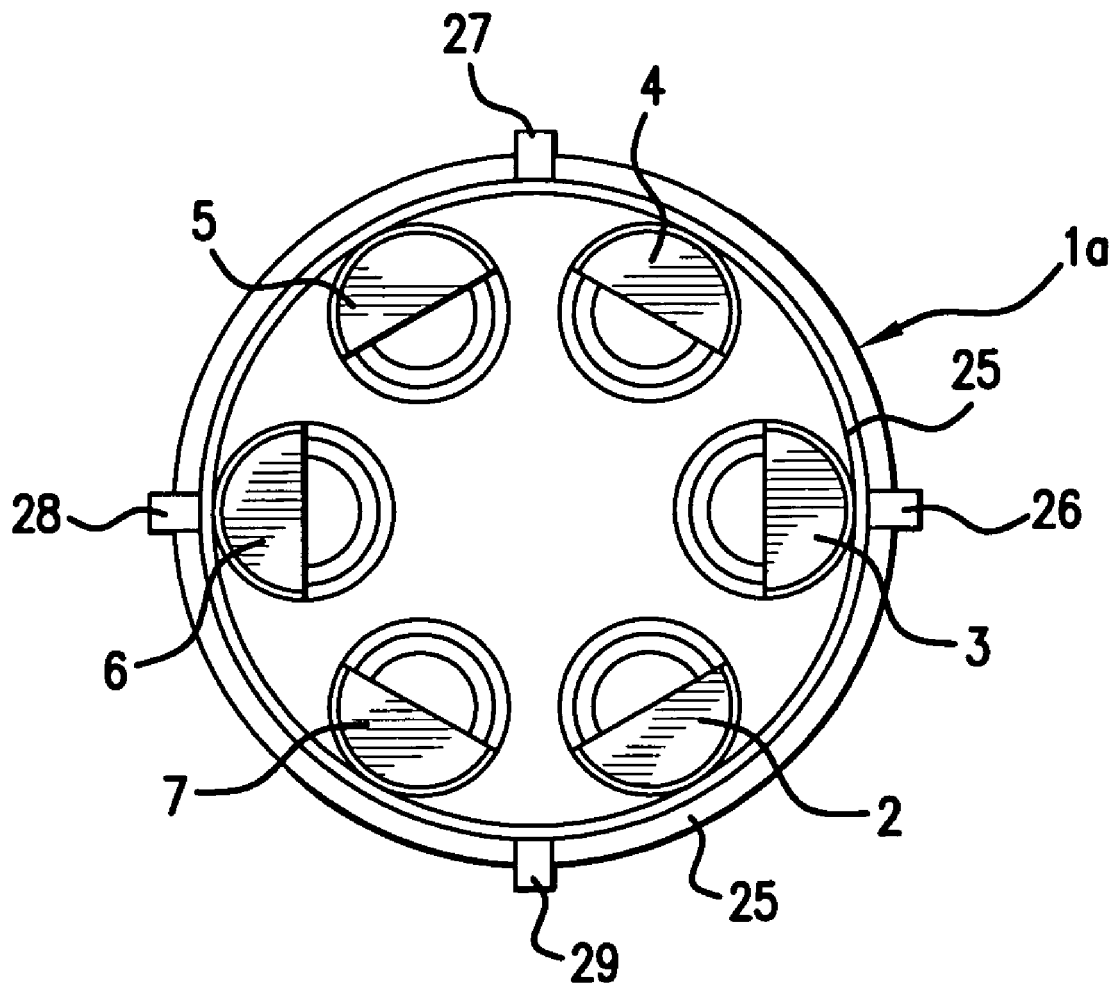
FIG. 5 shows the capsule magazine unit according to FIG. 4 when detached, in a plan view.

In another embodiment according to FIGS. 4 and 5, the blocking-ring lifting elements 26–29 protrude from the outer edge of the blocking ring 25. Preferably, the four blocking-ring lifting elements, are configured as lugs and protrude uniformly along the circumference of the blocking ring without being allocated to a capsule removal position or latching position of the capsule magazine unit 1a.

Base 23a does not need to include outwardly open slits in this embodiment, since the removal of the capsule magazine unit is not obstructed by the blocking-ring lifting elements 26–29. The lifting elements 26–29 rest, in FIG. 4, on the edge of the capsule magazine removal opening 31 and, during removal of the capsule magazine unit 1a, are lifted together with the blocking ring 23a by the base 23a coming into contact with them.

While illustrative embodiments of the invention are disclosed herein, it will be appreciated that numerous modifications and other embodiments may be devised by those skilled in the art. For example, the retaining member can have other shapes than a ring, and more than one may be provided to cover the different capsule removal openings. If desired in some embodiments, the lugs on the magazine holding portion an be used to require rotation of the magazine unit to a certain position before removal thereof from the magazine holder. Therefore, it will be understood that the appended claims are intended to cover all such modifications and embodiments that come within the spirit and scope of the present invention.

What is claimed is:

1. A capsule magazine unit that is releasably associable with a magazine receiving portion of a device for preparing a food or beverage, comprising:
    at least one capsule magazine configured for receiving a plurality of capsules that contain a substance for preparing the food or beverage, the magazine having a removal opening configured and dimensioned for removal of the capsules from the magazine;
    a capsule retainer associated with the magazine and movable with respect thereto between a retaining position, in which the retaining member blocks the removal opening sufficiently to keep the capsules from falling through the retaining opening, and a releasing position, in which the retaining member allows the capsules to be removed from the magazine through the opening for the preparation of the food or beverage; and
    a retainer positioner associated with the retainer and configured for moving the retainer between the retaining and the releasing position upon an association of the positioner with a first portion of the device.

2. The capsule magazine unit of claim 1, wherein the positioner extends from the retainer.

3. The capsule magazine unit of claim 1, wherein the positioner is configured for contacting the first portion as the magazine unit is placed into association with the magazine receiving portion, such that the first portion displaces the positioner, which displaces the retainer.

4. The capsule magazine unit of claim 3, wherein the first portion blocks the positioner from movement past the first portion during insertion of the capsule magazine unit into the magazine receiving portion.

5. The capsule magazine unit of claim 3, wherein the retainer is slideably mounted with respect to the capsule magazine.

6. The capsule magazine unit of claim 3, further comprising a base configured for limiting movement of the retainer, wherein the base defines a slot with a shape and position corresponding to the first portion of the device and configured for allowing the first portion to pass through the base to the association with the positioner.

7. The capsule magazine unit of claim 6, wherein the slots are configured for allowing the first portion to pass through the base substantially unimpeded by the base.

8. The capsule magazine unit of claim 3, further comprising a base configured for limiting movement of the retainer, wherein the retainer protrudes laterally with respect to the base with respect to a direction of movement between the retaining and releasing positions, such that the first portion is able to pass adjacent the base to the association with the positioner.

9. The capsule of claim 3, wherein the positioner is configured for moving the retainer from the retaining position to the releasing position.

10. The capsule of claim 9, wherein the retainer is configured for moving from the releasing position to the retaining position by gravity.

11. The capsule magazine unit of claim 1, wherein the capsule magazine has a magazine axis along which the capsules are stacked, and the removal opening is configured and oriented for removal of the capsule therethrough in a generally radial direction with respect to the magazine axis.

12. The capsule magazine unit of claim 1, wherein the at least one capsule magazine comprises a plurality of capsule magazines.

13. The capsule magazine unit of claim 12, wherein the capsule magazines are disposed generally parallel to each other.

14. The capsule magazine unit of claim 12, wherein the capsule magazines are arranged substantially round shape for positioning the magazines in unloading positions with a revolving member of the magazine receiving portion.

15. The capsule magazine unit of claim 13, wherein the retainer comprises a capsule retaining ring surrounding the capsule magazines.

16. The capsule magazine unit of claim 1, wherein the magazine is configured for receiving capsules that are dimensioned to each contain a beverage component with in an amount to prepare a single serving of a beverage.

17. The capsule magazine unit of claim 16, wherein the capsules contain coffee.

18. A food preparation device for preparing a food or beverage, comprising:
    the capsule magazine unit of claim 1;
    a magazine receiving portion comprising the first portion; and
    a capsule handling mechanism operably associable with the capsules for removing the capsules from the removal opening and for removing contents thereof.

19. The food preparation device of claim 18, further comprising a mixing device configured for mixing contents of the capsules with a fluid to produce the food or beverage.

20. The food preparation device of claim 19, wherein the food is a beverage and the food preparation device is a beverage preparation device.

21. A beverage preparation device for preparing a beverage, comprising:
    a magazine receiving portion;
    a capsule magazine unit that is releasably associable with the magazine receiving portion, the magazine unit comprising:
        at least one capsule magazine configured for receiving a plurality of capsules that contain a substance for preparing the food, the magazine having a removal opening configured and dimensioned for removal of the capsules from the magazine;
        a capsule retainer associated with the magazine and movable with respect thereto between a retaining position, in which the retaining member blocks the removal opening sufficiently to keep the capsules from falling through the retaining opening, and a releasing position, in which the retaining member allows the capsules to be removed from the magazine through the opening for the preparation of the food; and
        a retainer positioner associated with the retainer and configured for moving the retainer between the retaining and the releasing position upon an association of the positioner with a first portion of the food preparation machine; and
    a mixing device configured for mixing contents of the capsules with a fluid to produce beverages.

* * * * *